US012785107B2

(12) United States Patent
Jeong et al.

(10) Patent No.: US 12,785,107 B2
(45) Date of Patent: Nov. 3, 2026

(54) CURRENT COLLECTOR FOR LITHIUM METAL BATTERY, PREPARING METHOD OF THE SAME, AND LITHIUM METAL BATTERY COMPRISING THE SAME

(71) Applicant: RESEARCH & BUSINESS FOUNDATION SUNGKYUNKWAN UNIVERSITY, Suwon-si (KR)

(72) Inventors: Hyung Mo Jeong, Suwon-si (KR); Woo Hyeong Sim, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 1054 days.

(21) Appl. No.: 17/877,009

(22) Filed: Jul. 29, 2022

(65) Prior Publication Data

US 2023/0032580 A1 Feb. 2, 2023

(30) Foreign Application Priority Data

Jul. 29, 2021 (KR) ........................ 10-2021-0099932

(51) Int. Cl.
*H01M 4/66* (2006.01)
*H01M 4/38* (2006.01)
*H01M 50/426* (2021.01)
*H01M 50/46* (2021.01)

(52) U.S. Cl.
CPC ........... *H01M 4/661* (2013.01); *H01M 4/382* (2013.01); *H01M 50/426* (2021.01); *H01M 50/46* (2021.01)

(58) Field of Classification Search
CPC .... H01M 4/661; H01M 4/382; H01M 50/426; H01M 50/46; H01M 4/80; H01M 4/808
See application file for complete search history.

(56) References Cited

U.S. PATENT DOCUMENTS

2004/0072079 A1* 4/2004 Hashimoto ........... H01M 4/662 429/231.1

FOREIGN PATENT DOCUMENTS

CN 110867559 A 3/2020
KR 10-2020-0001244 A 1/2020

* cited by examiner

*Primary Examiner* — Keith Walker
*Assistant Examiner* — Steven S Ha
(74) *Attorney, Agent, or Firm* — LEX IP MEISTER, PLLC

(57) ABSTRACT

The present disclosure relates to a current collector for a lithium metal battery, the current collector comprising a metal substrate having a plurality of cracks formed therein.

10 Claims, 21 Drawing Sheets

[FIG.1]
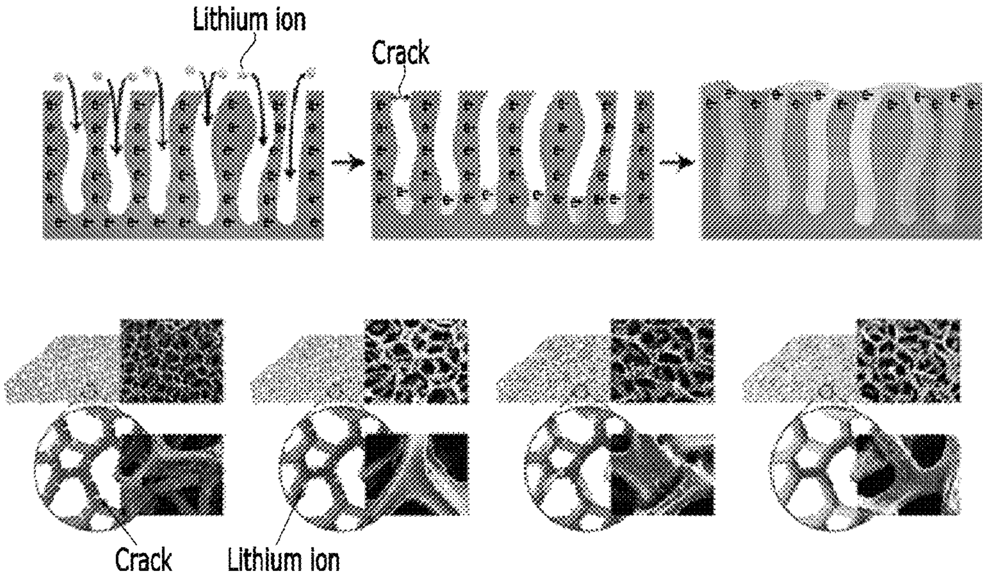

[FIG.2]
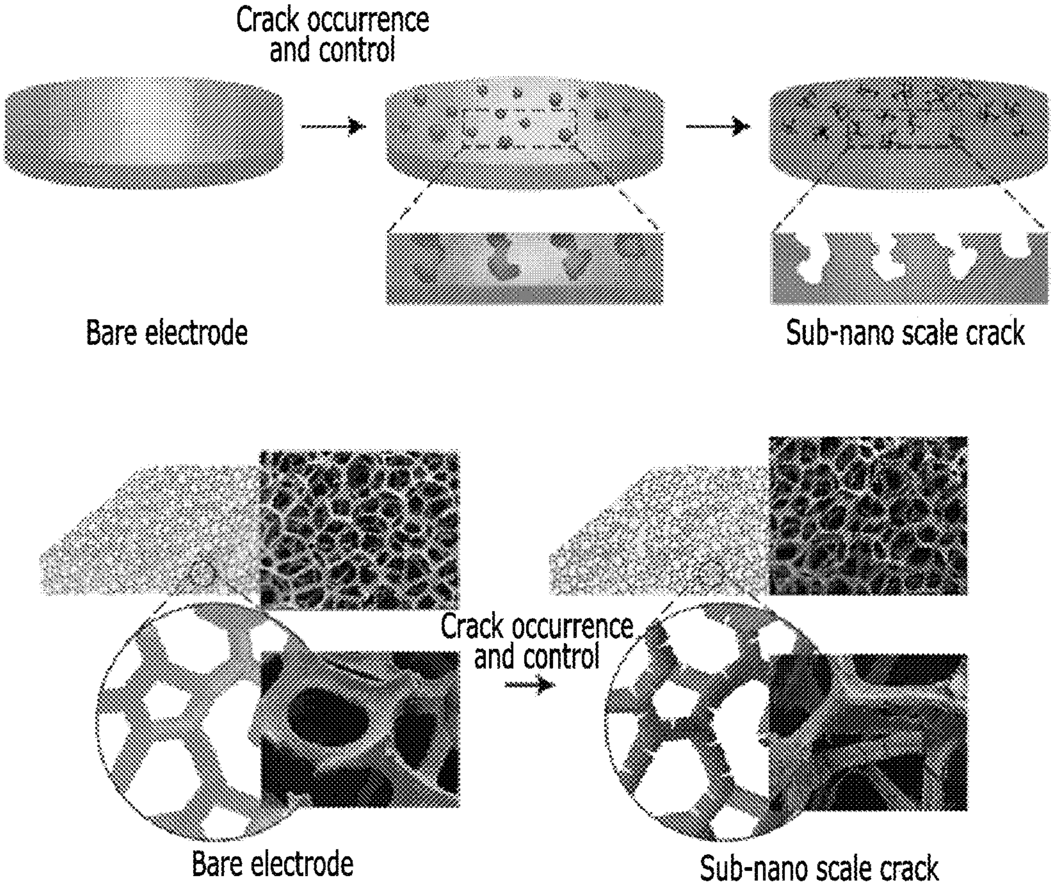

[FIG.3]
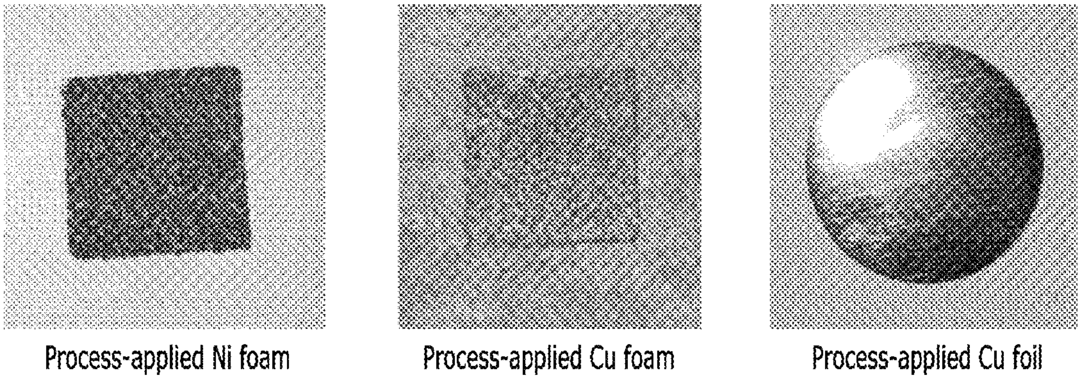

[FIG. 4]
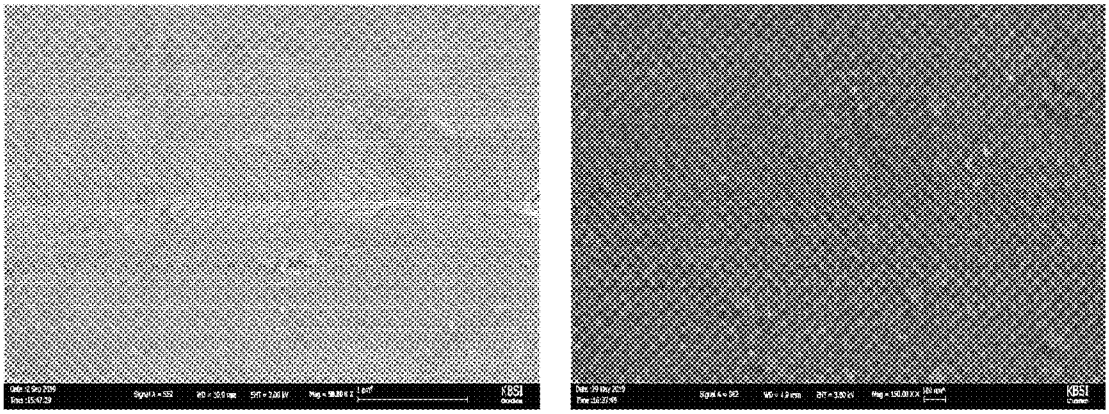
Comparative Example 1
Example 1

[FIG.5]
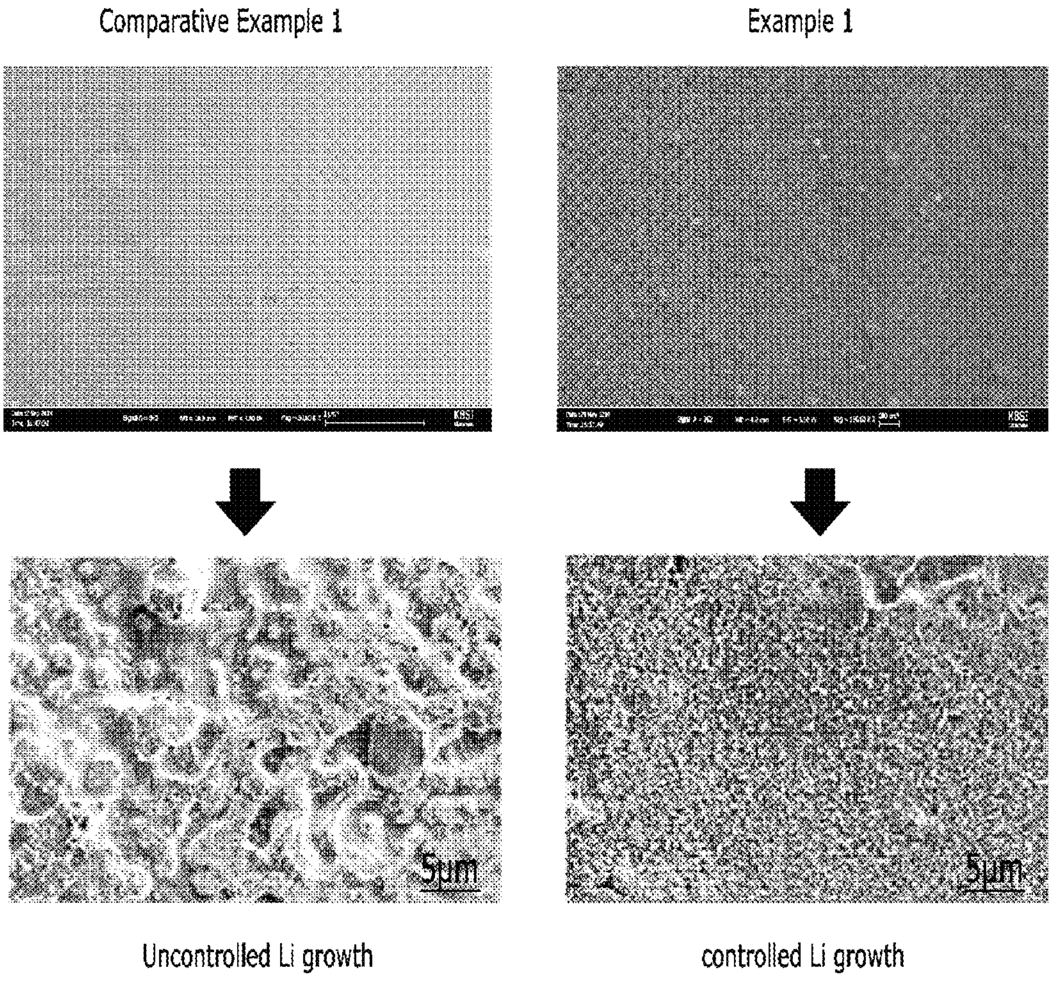

[FIG.6]
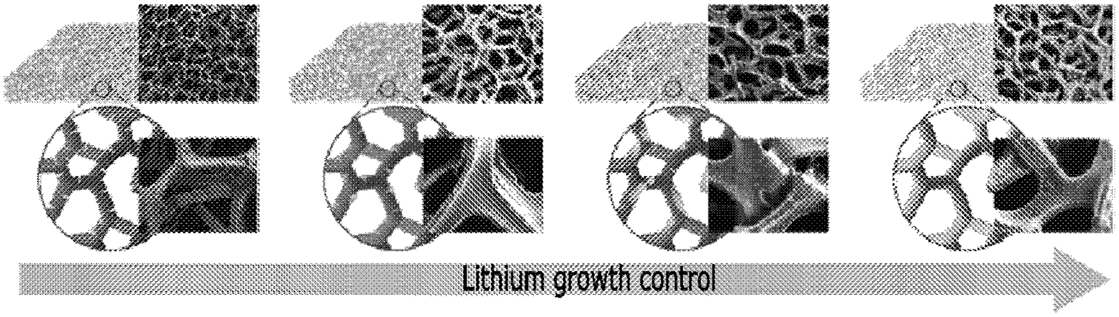

[FIG.7]
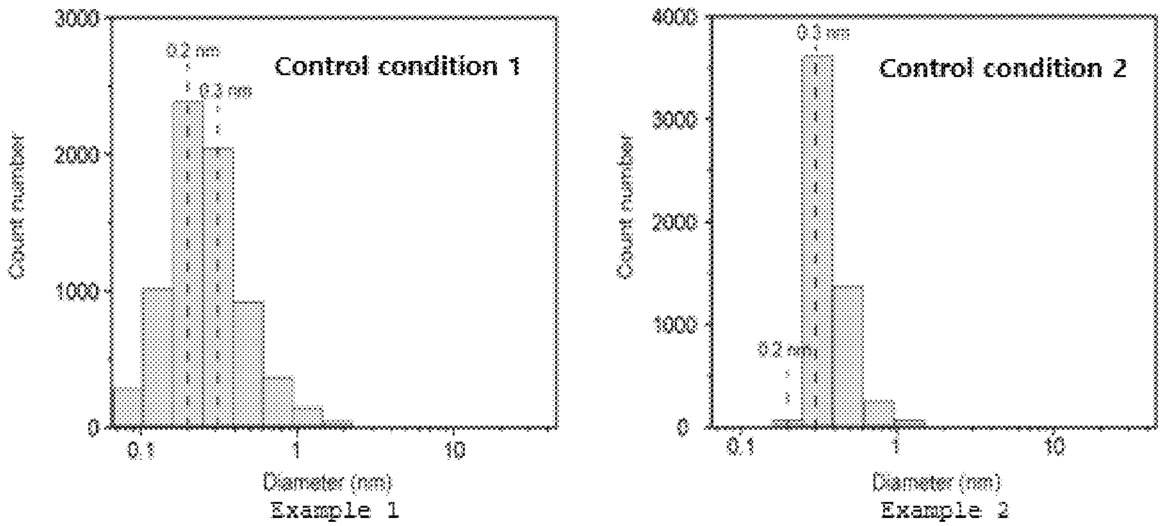
Example 1
Example 2

[FIG. 8A]
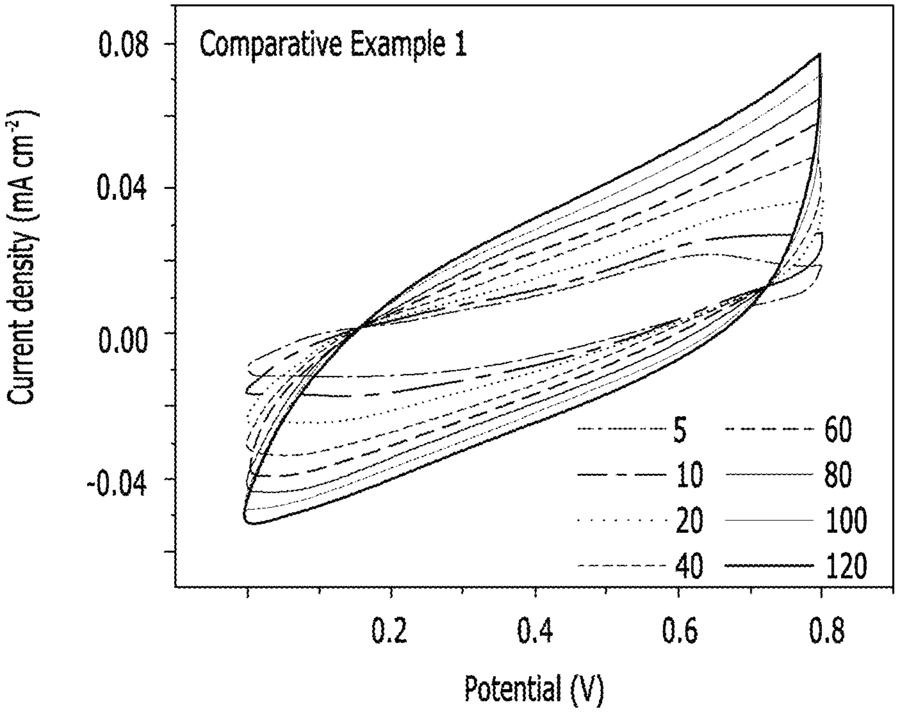

[FIG. 8B]
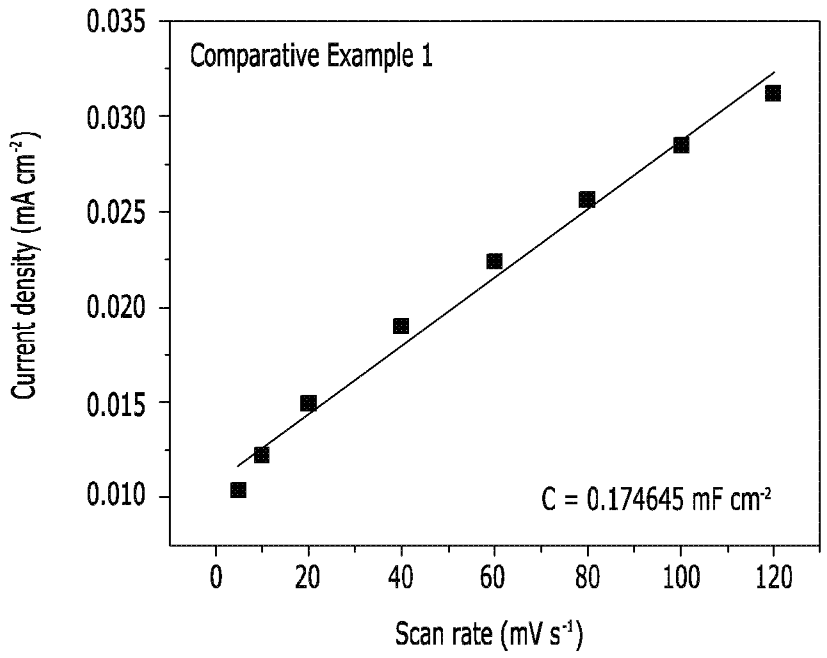

[FIG.8C]
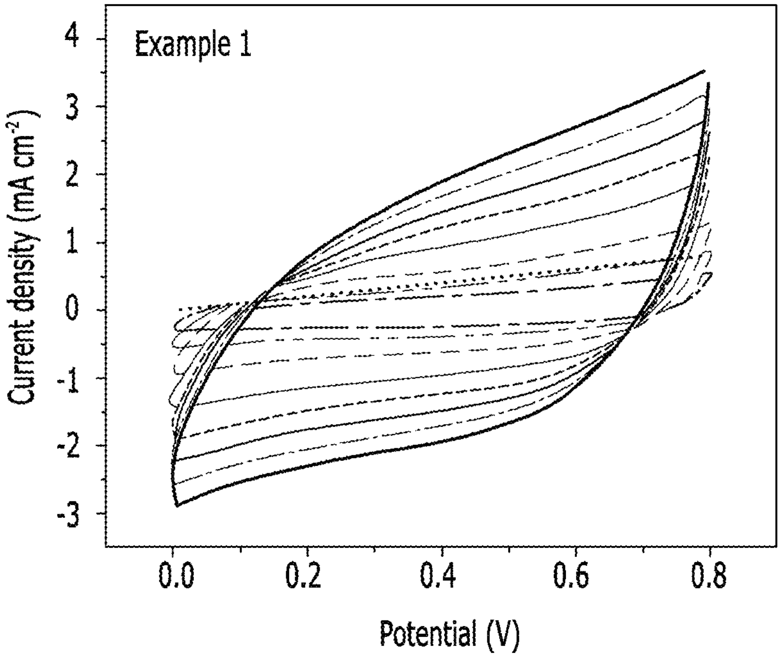

[FIG.8D]
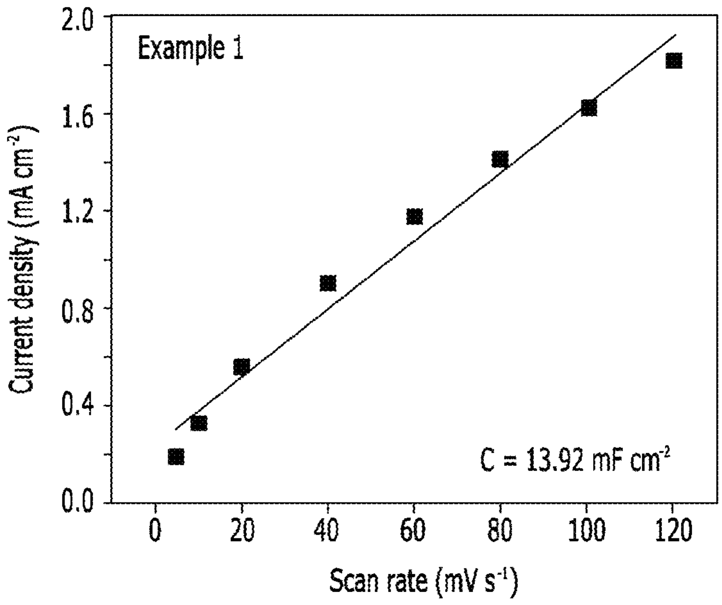

[FIG. 9A]
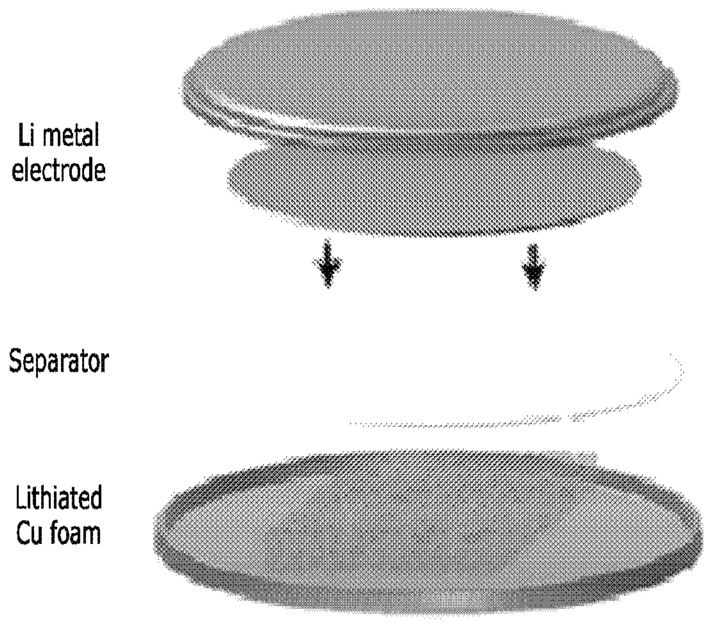

[FIG.9B]
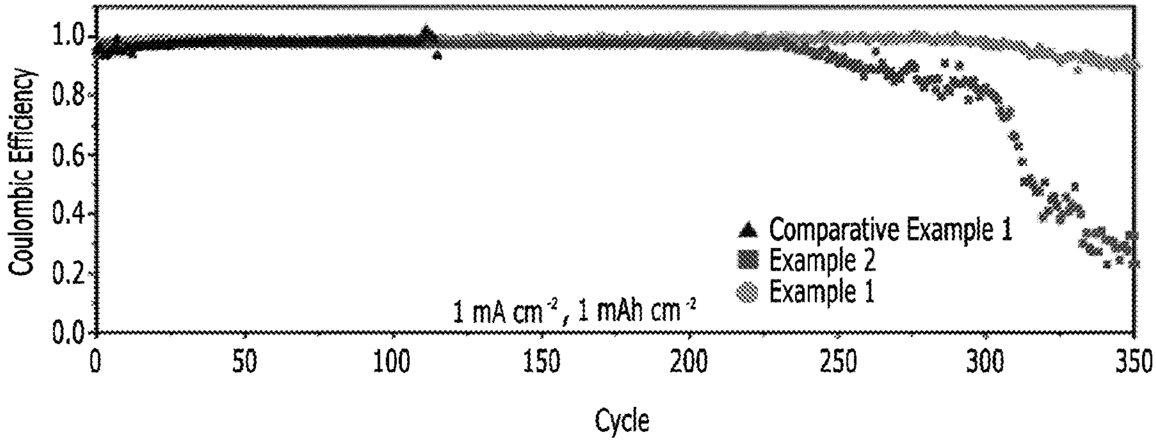

[FIG. 9C]
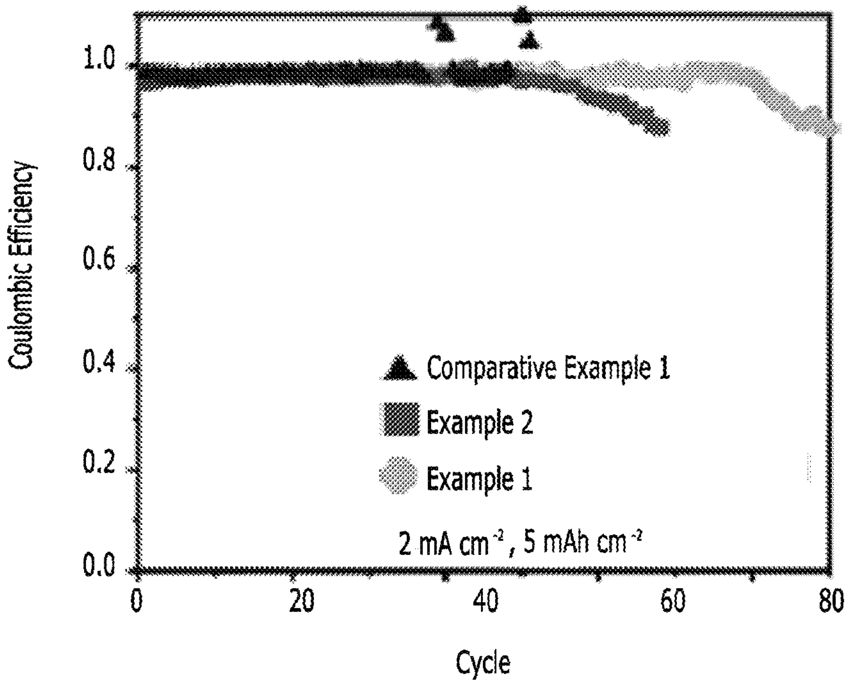

[FIG. 9D]
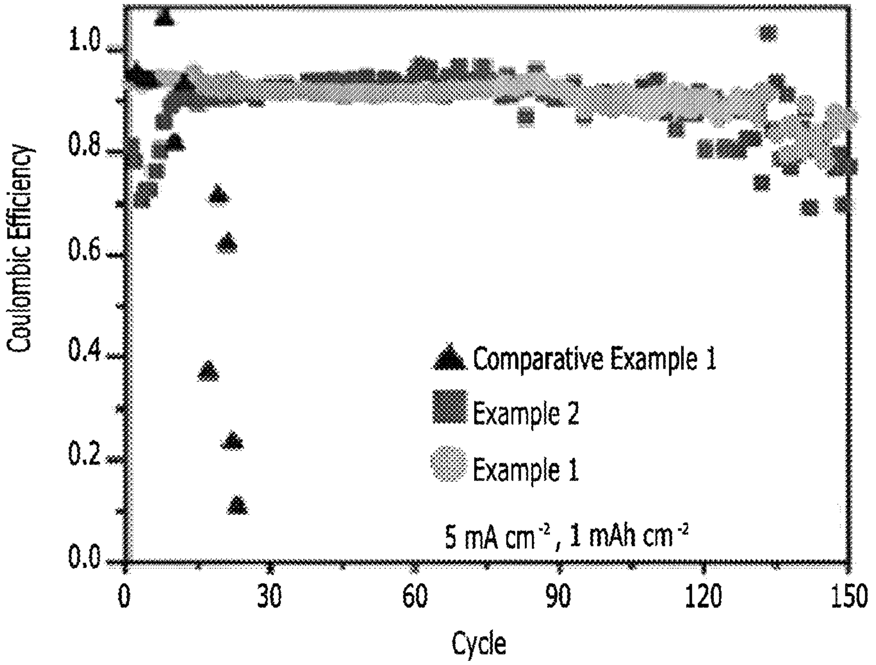

[FIG. 9E]
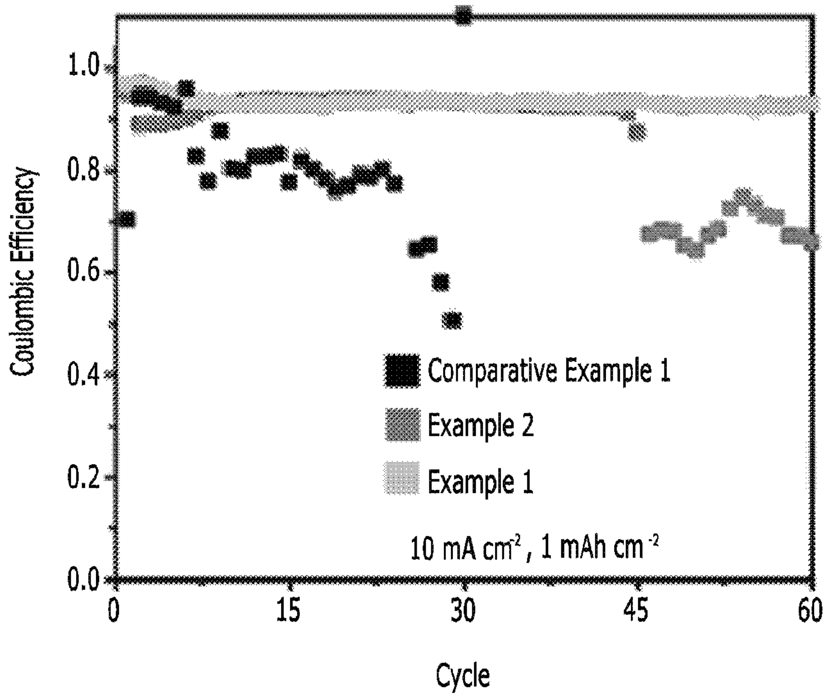

[FIG.10A]
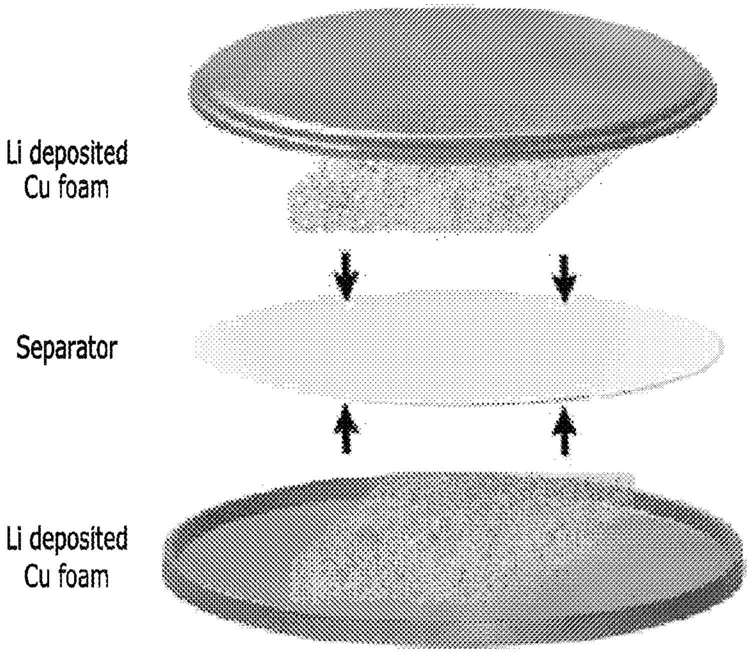

[FIG.10B]
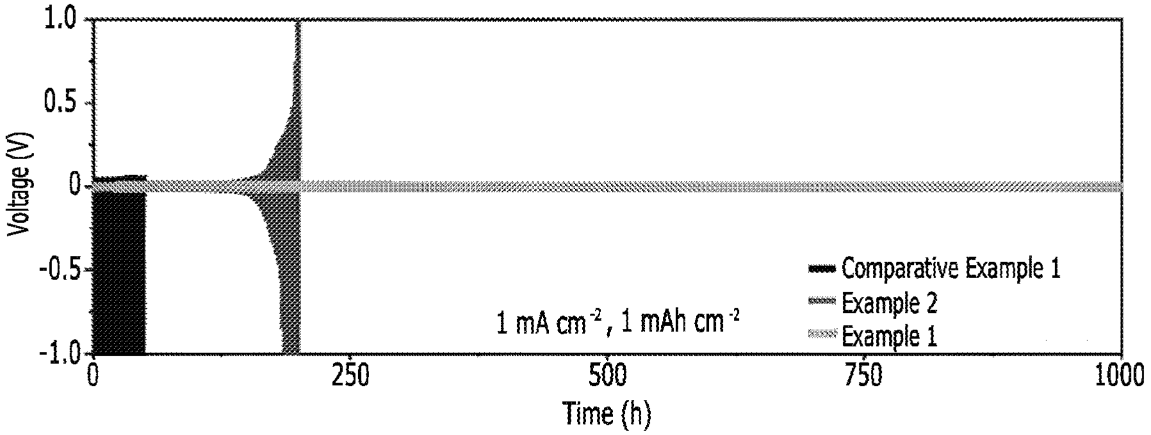

[FIG.11A]
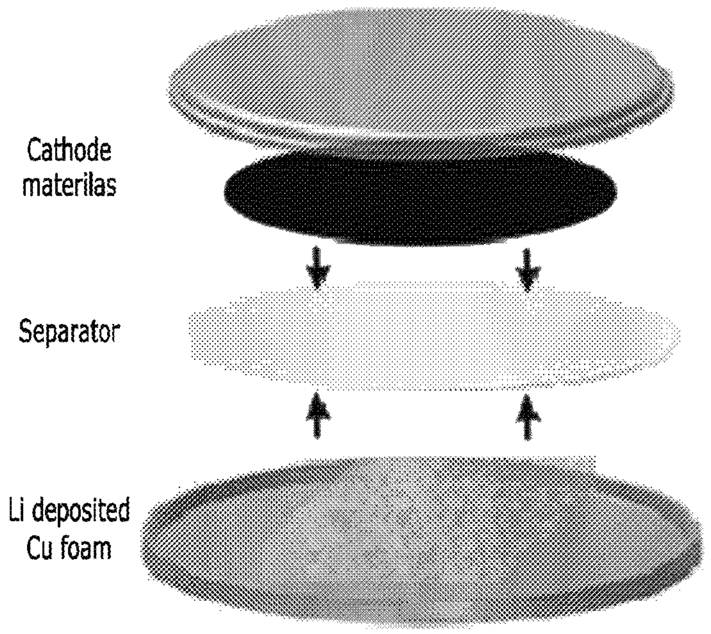

[FIG. 11B]
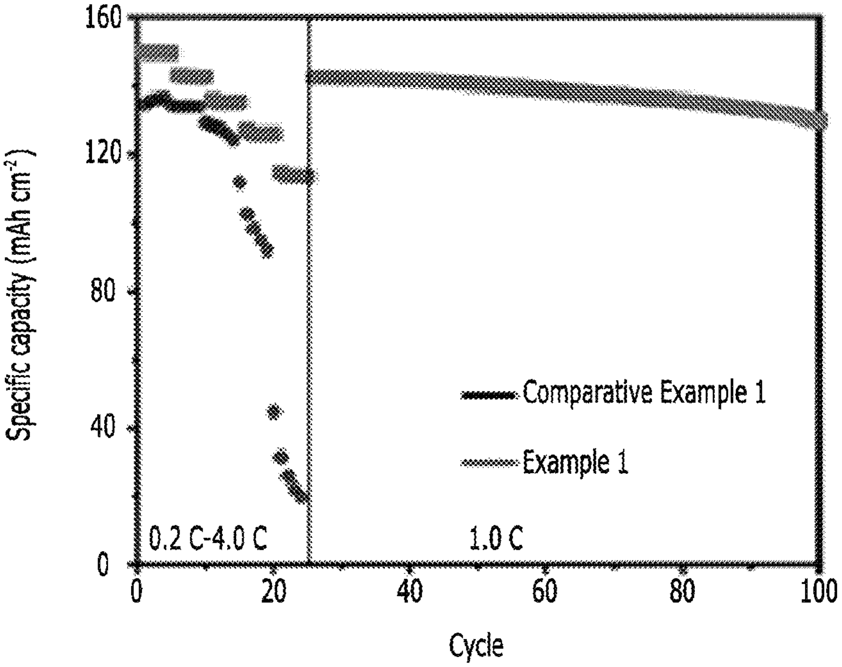

[FIG.11C]
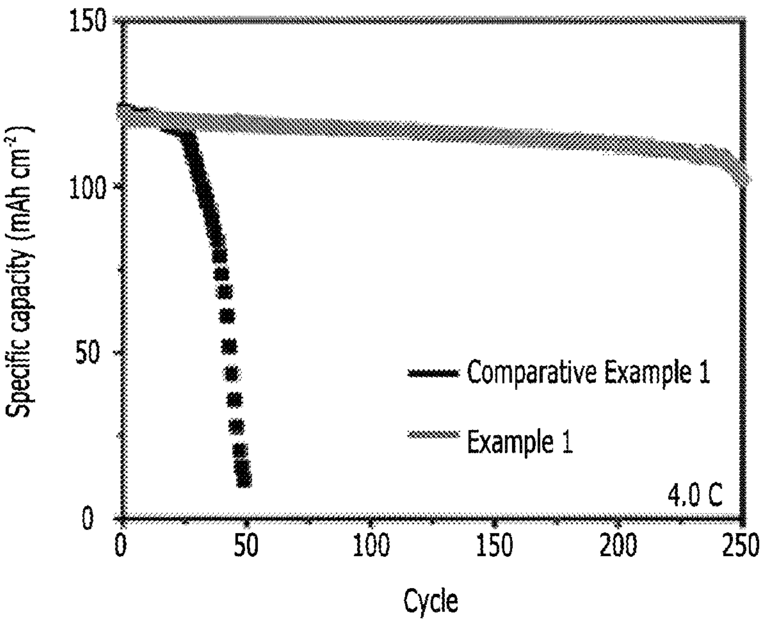

CURRENT COLLECTOR FOR LITHIUM METAL BATTERY, PREPARING METHOD OF THE SAME, AND LITHIUM METAL BATTERY COMPRISING THE SAME

CROSS REFERENCE TO RELATED APPLICATIONS

This application claims the benefit under 35 USC 119(a) of Korean Patent Application No. 10-2021-0099932 filed on Jul. 29, 2021, in the Korean Intellectual Property Office, the entire disclosure of which is incorporated herein by reference for all purposes.

FIELD

The present disclosure relates to a current collector for a lithium metal battery, a manufacturing method thereof, and a lithium metal battery comprising the same.

DESCRIPTION OF THE RELATED ART

Since lithium metal has excellent theoretical energy density of 3,860 mAh/g and has a very low standard reduction potential (SRP) of −3.045 V, it is possible to realize high capacity, and high energy density batteries. Recently, as interest in lithium-sulfur and lithium-air batteries is growing, it is being actively studied as an anode active material for lithium secondary batteries.

However, when lithium metal is used as an anode of a lithium secondary battery, lithium metal reacts with an electrolyte, impurities, a lithium salt, etc. to form a passivation layer (Solid Electrolyte Interphase, SEI), and such a passivation layer causes a difference in local phase current density. Therefore, the formation of dendrites by lithium metal is promoted during charging, and the dendrites gradually grow to cause an internal short circuit between the cathode and the anode during charging and discharging. Further, the dendrites have a mechanically weak portion (bottle neck) and form inactive lithium (dead lithium) that loses electrical contact with the current collector during discharge, thereby reducing the capacity of the battery, shortening the cycle life, and having a detrimental effect on stability of the battery.

In order to control the formation of lithium dendrites, studies on anode materials formed on current collectors have been actively conducted up to now, but this is a structure that absolutely requires the current collectors and the anode materials, and such a structure has a problem in realizing the high energy density that is a characteristic of a lithium metal-based battery due to the volume of the anode.

Meanwhile, although a porous electrode and a current collector containing a special functional group have been studied to use only a current collector without an anode material in the anode, there is still a problem in that a complicated process is accompanied and the fundamental growth of dendrites cannot be suppressed.

Therefore, there is a need for the development of a lithium metal battery having high output and high energy density using only a current collector in the anode without accompanying anode material and complicated process.

Korean Laid-Open Patent Publication No. 10-2020-0001244 relates to a porous current collector, and an electrode and a lithium secondary battery comprising the same. The above patent discloses that a polymer fiber containing carbon is coated with a metal, and a porous current collector manufactured using the same is applied to a lithium secondary battery to inhibit the growth of lithium dendrites, but no mention is made on a current collector in which a plurality of cracks are formed.

CONTENT OF THE INVENTION

Problem to be Solved

The present disclosure is to solve the above-described problems of the conventional art, and an object of the present disclosure is to provide a current collector for a lithium metal battery, which is capable of uniformly depositing locally dense lithium metal within the cracks by forming a plurality of cracks in the current collector.

Another object of the present disclosure is to provide a method for manufacturing the current collector for a lithium metal battery.

Another object of the present disclosure is to provide a lithium metal battery comprising an anode composed only of the current collector for a lithium metal battery without an anode active material.

However, the technical tasks to be achieved by the embodiments of the present disclosure are not limited to the technical tasks described above, and other technical tasks may exist.

Problem Solving Means

As a technical means for achieving the above-described technical task, a first aspect of the present disclosure provides a current collector for a lithium metal battery, the current collector comprising a metal substrate having a plurality of cracks formed therein.

According to one embodiment of the present disclosure, the cracks may have an average diameter of 1 nm or less, but is not limited thereto.

According to one embodiment of the present disclosure, overlapping of an electrical double layer may occur in the cracks when a voltage is applied because the cracks have an average diameter of 1 nm or less, but is not limited thereto.

According to one embodiment of the present disclosure, lithium ions may be moved into the cracks and concentrated by overlapping of the electrical double layer, but is not limited thereto.

According to one embodiment of the present disclosure, the growth of lithium dendrites may be suppressed by the cracks, but is not limited thereto.

According to one embodiment of the present disclosure, the metal substrate may be selected from the group consisting of copper, nickel, zinc, cobalt, stainless steel, and combinations thereof, but is not limited thereto.

According to one embodiment of the present disclosure, the metal substrate may include a form selected from the group consisting of a foil, a foam, a film, and combinations thereof, but is not limited thereto.

Furthermore, a second aspect of the present disclosure provides a method for manufacturing a current collector for a lithium metal battery, the method comprising the steps of: oxidizing a metal substrate; and forming sub-nano sized cracks by electrochemically reacting metal ions on the oxidized metal substrate.

According to one embodiment of the present disclosure, the metal ions may include metal ions selected from the group consisting of Li, Na, K, Zn, Mg, and combinations thereof, but is not limited thereto.

According to one embodiment of the present disclosure, the average diameter of the cracks may be adjusted by adjusting the intensity of the voltage in the step of forming the cracks, but is not limited thereto.

Furthermore, a third aspect of the present disclosure provides a lithium metal battery comprising: a current collector according to the first aspect of the present disclosure; a separator disposed on the current collector; and an electrode formed on the separator.

According to one embodiment of the present disclosure, lithium ions are moved into the cracks of the current collector during charging and discharging of the lithium metal battery so that lithium metal may be uniformly deposited, but is not limited thereto.

According to one embodiment of the present disclosure, the separator may include one selected from the group consisting of polypropylene, polyethylene, polyvinylidene fluoride, and combinations thereof, but is not limited thereto.

According to one embodiment of the present disclosure, the electrode may include one selected from the group consisting of lithium cobalt oxide, lithium nickel cobalt manganese oxide, lithium nickel cobalt aluminum oxide, lithium iron phosphate, lithium manganese oxide, and combinations thereof, but is not limited thereto.

The above-described problem solving means are merely exemplary, and should not be construed as an intention of limiting the present disclosure. In addition to the exemplary embodiments described above, additional embodiments may exist in the drawings and detailed description of the invention.

Effects of the Invention

In the conventional lithium metal battery, research has been mainly conducted on an anode material formed on the current collector to suppress the growth of lithium dendrites and uniformly deposit lithium metal, and since the anode material itself has the function of inhibiting the growth of lithium dendrites, the current collector and anode material were certainly required in the structure of the battery. However, such a structure had difficulties in realizing high energy density due to the volume of the anode. Meanwhile, when a lithium metal battery is constructed using only a general current collector without an anode material, the behavior of lithium ions cannot be controlled so that the growth of lithium dendrites occurs, and due to this, there has been a problem in that fire and explosion may occur. In order to solve this problem, research on a current collector containing a porous electrode and a special functional group is being conducted, but a complicated process is required, and a method of partially delaying the growth of lithium dendrites by a relatively large specific surface area due to pores has been proposed as a main solution method. However, there is still a problem in that it cannot inhibit the growth of fundamental lithium dendrites.

However, in the current collector for a lithium metal battery according to the present disclosure, very narrow cracks with an average diameter of 1 nm or less are formed in the current collector itself, and due to the structure in which the narrow cracks are formed, overlapping of an electrical double layer occurs inside the cracks when a voltage is applied. Due to this, the charge distribution on the surface of the cracks increases so that lithium ions may be concentrated inside the cracks, and lithium metal may be uniformly and densely electrodeposited without the growth of lithium dendrites. This is due to the specificity of the current collector structure, and thermodynamically stable control of lithium may be possible without additional processes such as a doping process and introduction of other functional groups.

Further, the current collector for a lithium metal battery according to the present disclosure is applied to a lithium metal battery so that a lithium metal battery which is free from an anode material, such as graphite and a carbon-based material, used in conventional lithium metal batteries may be constructed, and a lithium metal battery having high output and high energy density may be realized due to the structure without the anode material.

Further, since the overall volume or shape of the current collector is not changed when a very narrow crack structure of the current collector for a lithium metal battery according to the present disclosure is formed on the current collector, it not only can be applied to general commercial current collectors, but also does not affect the existing battery configuration and production process.

However, the effects obtainable in the present disclosure are not limited to the effects as described above, and other effects may exist.

BRIEF DESCRIPTION OF THE DRAWINGS

FIG. 1 is schematic diagrams showing a process in which lithium metal is deposited on a current collector for a lithium metal battery according to one embodiment of the present disclosure and SEM images confirming the deposition process of the actual lithium metal.

FIG. 2 is schematic diagrams of a method for manufacturing a current collector in the form of a foil and a foam according to a method for manufacturing a current collector for a lithium metal battery according to one embodiment of the present disclosure.

FIG. 3 is example photographs of current collectors for a lithium metal battery manufactured by applying the crack forming process of a current collector for a lithium metal battery according to one Example of the present disclosure to current collectors made of various forms and materials.

FIG. 4 is images of current collectors for a lithium metal battery according to one Example and one Comparative Example of the present disclosure.

FIG. 5 is images of observing the surfaces thereof after growing lithium metal on the current collectors according to one Example and one Comparative Example of the present disclosure.

FIG. 6 is SEM images of actually analyzing step-by-step lithium growth control in a method for manufacturing a current collector for a lithium metal battery according to one Example of the present disclosure and schematic diagrams simulating the same.

FIG. 7 is graphs showing the average diameters of cracks according to control conditions during the manufacturing process of the current collector for a lithium metal battery according to one Example of the present disclosure.

FIGS. 8A and 8C are CV curves of the current collectors according to one Example and one Comparative Example of the present disclosure, and FIGS. 8B and 8D are graphs of calculating the active surface areas based on the CV curves of the current collectors according to one Example and one Comparative Example of the present disclosure.

FIG. 9A is a schematic diagram of a half-cell using the current collector according to one Example of the present disclosure, and FIGS. 9B to 9E are graphs of measuring the coulombic efficiencies of half-cells using the current collectors according to one Example and one Comparative Example of the present disclosure.

FIG. 10A is a schematic diagram of a symmetric cell using the current collector according to one Example of the present disclosure, and FIG. 10B is a graph of showing the voltages over time of symmetric cells using the current collectors according to one Example and one Comparative Example of the present disclosure.

FIG. 11A is a schematic diagram of a full cell using the current collector according to one Example of the present disclosure, and FIGS. 11B and 11C are specific capacity graphs of full cells using the current collectors according to one Example and one Comparative Example of the present disclosure.

DETAILED DESCRIPTION OF THE EMBODIMENT

Hereinafter, embodiments of the present disclosure will be described in detail with reference to the accompanying drawings so that those with ordinary skill in the art to which the present disclosure pertains will easily be able to implement the present disclosure.

However, the present disclosure may be implemented in various different forms and is not limited to the embodiments described herein. Further, parts irrelevant to the description are omitted in order to clearly describe the present disclosure in the drawings, and similar reference numerals are attached to similar parts throughout the specification.

In the whole specification of the present disclosure, when a part is said to be “connected” with other part, it not only includes a case that the part is “directly connected” to the other part, but also includes a case that the part is “electrically connected” to the other part with another element being interposed therebetween.

In the whole specification of the present disclosure, when any member is positioned “on”, “over”, “above”, “beneath”, “under”, and “below” other member, this not only includes a case that the any member is brought into contact with the other member, but also includes a case that another member exists between two members.

In the whole specification of the present disclosure, if a prescribed part “includes” a prescribed element, this means that another element can be further included instead of excluding other elements unless any particularly opposite description exists.

When unique manufacture and material allowable errors of numerical values are suggested to mentioned meanings of terms of degrees used in the present specification such as “about”, “substantially”, etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present disclosure. Further, in the whole specification of the present disclosure, “a step to do ~” or “a step of ~” does not mean “a step for ~”.

In the whole specification of the present disclosure, a term of “a combination thereof” included in a Markush type expression, which means a mixture or combination of one or more selected from the group consisting of constituent elements described in the Markush type expression, means including one or more selected from the group consisting of the constituent elements.

In the whole specification of the present disclosure, description of “A and/or B” means “A, B, or A and B”.

Hereinafter, a current collector for a lithium metal battery according to the present disclosure, a manufacturing method thereof, and a lithium metal battery comprising the same will be described in detail with reference to embodiments, examples, and drawings. However, the present disclosure is not limited to such embodiments, examples, and drawings.

As a technical means for achieving the above-described technical task, the first aspect of the present disclosure provides a current collector for a lithium metal battery, the current collector comprising a metal substrate having a plurality of cracks formed therein.

In the conventional lithium metal battery, research has been mainly conducted on an anode material formed on the current collector to suppress the growth of lithium dendrites and uniformly deposit lithium metal, and since the anode material itself has the function of inhibiting the growth of lithium dendrites, the current collector and anode material were certainly required in the structure of the battery. However, such a structure had difficulties in realizing high energy density due to the volume of the anode. Meanwhile, when a lithium metal battery is constructed using only a general current collector without an anode material, the behavior of lithium ions cannot be controlled so that the growth of lithium dendrites occurs, and due to this, there has been a problem in that fire and explosion may occur. In order to solve this problem, research on a current collector containing a porous electrode and a special functional group is being conducted, but a complicated process is required, and a method of partially delaying the growth of lithium dendrites by a relatively large specific surface area due to pores has been proposed as a main solution method. However, there is still a problem in that it cannot inhibit the growth of fundamental lithium dendrites.

However, the current collector for a lithium metal battery according to the present disclosure can control the behavior of lithium ions due to the specificity of the structure of the current collector without the use of an anode material, and due to this, lithium metal can be grown densely without the growth of lithium dendrites.

Further, when the current collector for a lithium metal battery according to the present disclosure is applied to a lithium metal battery, a lithium metal battery having high output and high energy density can be realized due to a structure without an anode material.

According to one embodiment of the present disclosure, the cracks may have an average diameter of 1 nm or less, but is not limited thereto.

In the current collector for a lithium metal battery according to one embodiment of the present disclosure, very narrow cracks having an average diameter of 1 nm or less are formed in the current collector itself, and due to the structure in which such narrow cracks are formed, lithium metal may be electrodeposited uniformly and densely without the growth of lithium dendrites.

According to one embodiment of the present disclosure, overlapping of an electrical double layer may occur in the cracks when a voltage is applied because the cracks have an average diameter of 1 nm or less, but is not limited thereto.

When a voltage is applied to the current collector for a lithium metal battery according to the present disclosure, overlapping of an electrical double layer occurs inside the cracks. Due to this, the charge distribution on the surface of the cracks may increase.

According to one embodiment of the present disclosure, lithium ions may be moved into the cracks and concentrated by overlapping of the electrical double layer, but is not limited thereto.

According to one embodiment of the present disclosure, the growth of lithium dendrites may be suppressed by the cracks, but is not limited thereto.

FIG. 1 is schematic diagrams showing a process in which lithium metal is deposited on a current collector for a lithium metal battery according to one embodiment of the present disclosure and SEM images confirming the deposition process of the actual lithium metal.

Referring to FIG. 1, when a voltage is applied to the current collector for a lithium metal battery according to the present disclosure, overlapping of an electrical double layer occurs due to the structural characteristics of very narrow cracks, and due to this, the charge distribution on the surface of the cracks may increase. Accordingly, lithium ions may be moved into the cracks and concentrated, and lithium metal may be uniformly deposited without the growth of lithium dendrites. This is due to the specificity of the current collector structure, and thermodynamically stable control of lithium may be possible without additional processes such as a doping process and introduction of other functional groups.

Referring to FIG. 1, it can be confirmed that cracks are formed on the surface of the current collector, and it can be confirmed that lithium ions are deposited inside the cracks without the growth of lithium dendrites on the surface of the current collector.

According to one embodiment of the present disclosure, the metal substrate may be selected from the group consisting of copper, nickel, zinc, cobalt, stainless steel, and combinations thereof, but is not limited thereto.

The current collector for a lithium metal battery according to the present disclosure may be applicable to all metals without limitation on the type of material due to process characteristics in addition to the aforementioned metals.

According to one embodiment of the present disclosure, the metal substrate may include a form selected from the group consisting of a foil, a foam, a film, and combinations thereof, but is not limited thereto.

The current collector for a lithium metal battery according to the present disclosure may form very narrow cracks in various types of metal substrates, such as a foil, a foam, and a film, regardless of the form of the metal substrate, but is not limited thereto.

Furthermore, the second aspect of the present disclosure provides a method for manufacturing a current collector for a lithium metal battery, the method comprising the steps of: oxidizing a metal substrate; and forming sub-nano sized cracks by electrochemically reacting metal ions on the oxidized metal substrate.

With respect to the method for manufacturing a current collector for a lithium metal battery of the second aspect of the present disclosure, detailed descriptions of parts overlapping with those of the first aspect of the present disclosure have been omitted, but even if the descriptions have been omitted, the contents described in the first aspect of the present disclosure may be equally applied to the second aspect of the present disclosure.

Hereinafter, a method for manufacturing a current collector for a lithium metal battery of the present disclosure will be described with reference to FIG. 2.

FIG. 2 is schematic diagrams of a method for manufacturing a current collector for a lithium metal battery according to one embodiment of the present disclosure.

Referring to FIG. 2, it can be confirmed that a current collector having a plurality of cracks formed therein is finally manufactured if a controlled crack occurrence process is used in a commonly used foil-type metal substrate or a foam-type metal substrate.

According to one embodiment of the present disclosure, the metal ions may include metal ions selected from the group consisting of Li, Na, K, Zn, Mg, and combinations thereof, but is not limited thereto.

According to one embodiment of the present disclosure, the average diameter of the cracks may be adjusted by adjusting the intensity of the voltage in the step of forming the cracks, but is not limited thereto.

In the method for manufacturing a current collector for a lithium metal battery of the present disclosure, the cracks may have various diameters by adjusting the intensity of the voltage in the step of forming the cracks, and a current collector with cracks having various average diameters formed therein may be manufactured using this.

Further, since the overall volume or shape of the current collector is not changed when the very narrow crack structure of the current collector for a lithium metal battery according to the present disclosure is formed on the current collector, it not only may be applied to general commercial current collectors, but also may not affect the configuration of an existing battery and the production process.

Furthermore, the third aspect of the present disclosure provides a lithium metal battery comprising: a current collector according to the first aspect of the present disclosure; a separator disposed on the current collector; and an electrode formed on the separator.

With respect to the lithium metal battery of the third aspect of the present disclosure, detailed descriptions of parts overlapping with those of the first aspect and/or the second aspect of the present disclosure have been omitted, but even if the descriptions have been omitted, the content described in the first aspect and/or the second aspect of the present disclosure may be equally applied to the third aspect of the present disclosure.

In the conventional lithium metal battery, research has been mainly conducted on an anode material formed on the current collector to suppress the growth of lithium dendrites and uniformly deposit lithium metal, and since the anode material itself has the function of inhibiting the growth of lithium dendrites, the current collector and anode material were certainly required in the structure of the battery. However, such a structure had difficulties in realizing high energy density due to the volume of the anode. Meanwhile, when a lithium metal battery is constructed using only a general current collector without an anode material, the behavior of lithium ions cannot be controlled so that the growth of lithium dendrites occurs, and due to this, there has been a problem in that fire and explosion may occur. In order to solve this problem, research on a current collector containing a porous electrode and a special functional group is being conducted, but a complicated process is required, and a method of partially delaying the growth of lithium dendrites by a relatively large specific surface area due to pores has been proposed as a main solution method. However, there is still a problem in that it cannot inhibit the growth of fundamental lithium dendrites.

However, in the current collector for a lithium metal battery according to the present disclosure, very narrow cracks with an average diameter of 1 nm or less are formed in the current collector itself, and due to the structure in which the narrow cracks are formed, overlapping of an electrical double layer occurs inside the cracks when a voltage is applied. Due to this, the charge distribution on the surface of the cracks increases so that lithium ions may be concentrated inside the cracks, and lithium metal may be uniformly and densely electrodeposited without the growth of lithium dendrites. This is due to the specificity of the current collector structure, and thermodynamically stable control of lithium may be possible without additional processes such as a doping process and introduction of other functional groups.

Further, the current collector for a lithium metal battery according to the present disclosure is applied to a lithium metal battery so that a lithium metal battery which is free from an anode material such as graphite and a carbon-based material used in conventional lithium metal batteries may be constructed, and a lithium metal battery having high output and high energy density may be realized due to the structure without the anode material.

Further, since the overall volume or shape of the current collector is not changed when a very narrow crack structure of the current collector for a lithium metal battery according to the present disclosure is formed on the current collector, it not only can be applied to general commercial current collectors, but also does not affect the configuration of an existing battery and production process.

According to one embodiment of the present disclosure, lithium ions are moved into the cracks of the current collector during charging and discharging of the lithium metal battery so that lithium metal may be uniformly deposited, but is not limited thereto.

The lithium metal battery according to the present disclosure may include a current collector having very narrow cracks with an average diameter of 1 nm or less formed therein, and during charging and discharging of the lithium metal battery, lithium ions may be concentrated inside the cracks, and lithium metal may be uniformly deposited without the growth of lithium dendrites.

According to one embodiment of the present disclosure, the separator may include one selected from the group consisting of polypropylene, polyethylene, polyvinylidene fluoride, and combinations thereof, but is not limited thereto.

According to one embodiment of the present disclosure, the electrode may include one selected from the group consisting of lithium cobalt oxide, lithium nickel cobalt manganese oxide, lithium nickel cobalt aluminum oxide, lithium iron phosphate, lithium manganese oxide, and combinations thereof, but is not limited thereto.

The above-described problem solving means are merely exemplary, and should not be construed as an intention of limiting the present disclosure. In addition to the exemplary embodiments described above, additional embodiments may exist in the drawings and detailed description of the invention.

Hereinafter, the present disclosure will be described in more detail through Examples, but the following Examples are for illustrative purposes only and are not intended to limit the scope of the present disclosure.

Example 1

First, a generally used metal current collector (a Ni foam, a Cu foam, a Cu foil, or the like) was oxidized at a temperature and time suitable for each type. In Example 1, the copper foam was used to manufacture the current collector.

Subsequently, the oxidized metal current collector was formed into an electrochemical cell together with a counter electrode (lithium, sodium foil, etc.) to be electrochemically reacted.

Subsequently, cracks were formed in the current collector by applying a voltage to the formed cell from the electrochemical reaction with the injected cation to the point where the main conversion reaction step ends.

Finally, after the reaction, a washing process was performed, and drying was performed to obtain a sample.

FIG. 3 is example photographs of current collectors for a lithium metal battery manufactured by applying the crack occurrence process of a current collector according to one Example of the present disclosure to current collectors made of various forms and materials.

Referring to FIG. 3, it can be confirmed that a current collector having cracks formed therein is manufactured using a nickel foam, a copper foam, or a copper foil, and it can be confirmed that the current collector can be manufactured regardless of the type and form of the metal.

FIG. 4 is images of current collectors for a lithium metal battery according to one Example and one Comparative Example of the present disclosure.

Referring to FIG. 4, it can be confirmed that the surface is roughened after the cracks are formed in the current collector.

Example 2

It was manufactured in the same manner as in Example 1, but even after the main conversion reaction was completed in the step of forming the cracks, cations were additionally injected, and a voltage was applied so that the thermodynamic voltage difference between two electrodes was minimized, thereby forming cracks.

Comparative Example 1

The generally used copper current collector before forming the cracks used in Example 1 was used as Comparative Example 1.

[Experimental Example 1] Lithium Deposition Comparison

FIG. 5 is images in which lithium metal is grown on the current collectors according to one Example and one Comparative Example of the present disclosure.

Referring to FIG. 5, when lithium metal is grown using a general current collector having no cracks in the surface thereof, it can be confirmed that the lithium metal is non-uniformly grown. Meanwhile, when lithium metal is grown using the current collector according to Example in which cracks are formed, it can be confirmed that lithium metal is uniformly grown.

Through Experimental Example 1, it could be confirmed that lithium metal might be uniformly deposited without the growth of lithium dendrites by using the current collector for a lithium metal battery according to the present disclosure.

FIG. 6 is SEM images of actually analyzing step-by-step lithium growth control in a method for manufacturing a current collector for a lithium metal battery according to one Example of the present disclosure and schematic diagrams simulating the same.

[Experimental Example 2] Control of the Average Diameter of Cracks

FIG. 7 is graphs showing the average diameters of cracks according to control conditions during the manufacturing process of the current collector for a lithium metal battery according to one Example of the present disclosure.

Specifically, the control condition 1 of FIG. 7 is a graph of the diameter size distribution of the cracks of Example 1 manufactured by applying a voltage from the electrochemical reaction with the injected cations to the point where the main conversion reaction step ends, wherein the number of cracks having a diameter of 0.2 nm is greater than the number of cracks having a diameter of 0.3 nm, and the control condition 2 of FIG. 7 is a graph of the diameter size distribution of the cracks of Example 2 manufactured by applying a voltage such that the thermodynamic voltage difference between the two electrodes is minimized by additionally injecting cations even after the main conversion reaction ends.

Referring to FIG. 7, it can be confirmed that the current collector manufactured by applying the voltage of the control condition 2 has a more uniform diameter distribution size.

Through Experimental Example 2, it could be confirmed that the average diameter could be adjusted by controlling the reaction voltage in the process of forming cracks.

[Experimental Example 3] Electrochemical Activation Area Analysis

FIGS. 8A and 8C are CV curves of the current collectors according to one Example and one Comparative Example of the present disclosure, and FIGS. 8B and 8D are graphs of calculating the active surface areas based on the CV curves of the current collectors according to one Example and one Comparative Example of the present disclosure.

Referring to FIG. 8, as results of obtaining the slopes by converting the values obtained in FIGS. 8A and 8C into straight line graphs, the graphs of FIGS. 8B and 8D were obtained respectively. As results of calculating the active surface areas using FIGS. 8B and 8D, it can be confirmed that the active surface area of the current collector according to the Example has a numerical value that is about 100 times greater than the active surface area of the current collector according to the Comparative Example.

[Experimental Example 4] Half-Cell Performance Comparison

FIG. 9A is a schematic diagram of a half-cell using the current collector according to one Example of the present disclosure, and FIGS. 9B to 9E are graphs of measuring the Coulombic efficiencies of half-cells using the current collectors according to one Example and one Comparative Example of the present disclosure.

Referring to FIG. 9, as results of comparing the efficiencies per cycle in 1 $mA/cm^2$ and 1 $mAh/cm^2$ conditions, 2 $mA/cm^2$ and 5 $mAh/cm^2$ conditions, 5 $mA/cm^2$ and 1 $mAh/cm^2$ conditions, and 10 $mA/cm^2$ and 1 $mAh/cm^2$ conditions respectively, it could be confirmed that the half-cells using the current collector of Comparative Example 1 did not maintain the Coulombic efficiency during a high cycle, and the half-cells using the current collectors of Examples 1 and 2 maintained the Coulombic efficiency during a high cycle. Particularly, it could be confirmed that the half-cells using the current collector of Example 1 stably maintained high efficiency even under high capacity and high current density conditions.

[Experimental Example 5] Symmetric Cell Performance Comparison

FIG. 10A is a schematic diagram of a symmetric cell using the current collector according to one Example of the present disclosure, and FIG. 10B is a graph of showing the voltages over time of symmetric cells using the current collectors according to one Example and one Comparative Example of the present disclosure.

Referring to FIG. 10, in the symmetric cell using the current collector according to Comparative Example 1, a sudden drop in potential was observed after about 50 hours. In the symmetric cell using the current collector according to Example 2, it could be confirmed that the potential decreased sharply after about 150 hours, which is a longer time than the symmetric cell using the current collector according to Comparative Example 1. This means that an internal short circuit of the battery has occurred, and this may cause fire or explosion.

Meanwhile, it can be confirmed that the symmetric cell using the current collector according to Example 1 of the present disclosure exhibits stable potential hysteresis for a long time compared to the symmetric cells using the current collectors according to Comparative Example 1 and Example 2.

[Experimental Example 6] Comparison of Full Cell Performance

FIG. 11A is a schematic diagram of a full cell using the current collector according to one Example of the present disclosure, and FIGS. 11B and 11C are specific capacity graphs of full cells using the current collectors according to one Example and one Comparative Example of the present disclosure.

Referring to FIG. 11B, as results of testing the stability of the cells while changing the C-rate (current density), it can be confirmed that the high capacity is maintained without a significant change even when the current density is increased in the case of a full cell using the current collector according to one Example of the present disclosure. However, it can be confirmed that a sudden decrease in capacity occurs when the current density increases in the case of a full cell using the current collector according to one Comparative Example of the present disclosure.

Referring to FIG. 11C, as results of comparing the stability at high current density (4.0 C-rate), it can be confirmed that the high capacity is maintained up to 250 cycles in the case of Example, whereas the rapid capacity decrease occurs after only 50 cycles in the case of Comparative Example.

The foregoing description of the present disclosure is for illustration, and those with ordinary skill in the art to which the present disclosure pertains will be able to understand that it can be easily modified into other specific forms without changing the technical spirit or essential features of the present disclosure. Therefore, it should be understood that the embodiments described above are illustrative in all respects and not restrictive. For example, each element described as a single form may be implemented in a dispersed form, and likewise elements described in the dispersed form may also be implemented in a combined form.

The scope of the present disclosure is indicated by the claims to be described later rather than the above detailed description, and all changes or modified forms derived from the meaning and scope of the claims and equivalent concepts thereof should be construed as being included in the scope of the present disclosure.

What is claimed is:

1. A current collector for a lithium metal battery, the current collector comprising a metal substrate having a plurality of cracks formed therein, wherein a number of cracks having a diameter of 0.2 nm is greater than a number of cracks having a diameter of 0.3 nm.

2. The current collector for a lithium metal battery of claim 1, wherein overlapping of an electrical double layer occurs in the cracks when a voltage is applied because of the cracks.

3. The current collector for a lithium metal battery of claim 2, wherein lithium ions are moved into the cracks and concentrated by overlapping of the electrical double layer.

4. The current collector for a lithium metal battery of claim 1, wherein the growth of lithium dendrites is suppressed by the cracks.

5. The current collector for a lithium metal battery of claim 1, wherein the metal substrate is selected from the group consisting of copper, nickel, zinc, cobalt, stainless steel, and combinations thereof.

6. The current collector for a lithium metal battery of claim 1, wherein the metal substrate includes a form selected from the group consisting of a foil, a foam, a film, and combinations thereof.

7. A lithium metal battery comprising:

a current collector according to claim 1;

a separator disposed on the current collector; and an electrode formed on the separator.

8. The lithium metal battery of claim 7, wherein lithium ions are moved into the cracks of the current collector during charging and discharging of the lithium metal battery so that lithium metal is uniformly deposited.

9. The lithium metal battery of claim 7, wherein the separator includes one selected from the group consisting of polypropylene, polyethylene, polyvinylidene fluoride, and combinations thereof.

10. The lithium metal battery of claim 7, wherein the electrode includes one selected from the group consisting of lithium cobalt oxide, lithium nickel cobalt manganese oxide, lithium nickel cobalt aluminum oxide, lithium iron phosphate, lithium manganese oxide, and combinations thereof.

* * * * *